No. 633,381.  
W. N. HOUGHTALING.  
SPRING BOARD SEAT FOR DUMPING CARTS.  
(Application filed Aug. 14, 1899.)
Patented Sept. 19, 1899.
(No Model.)
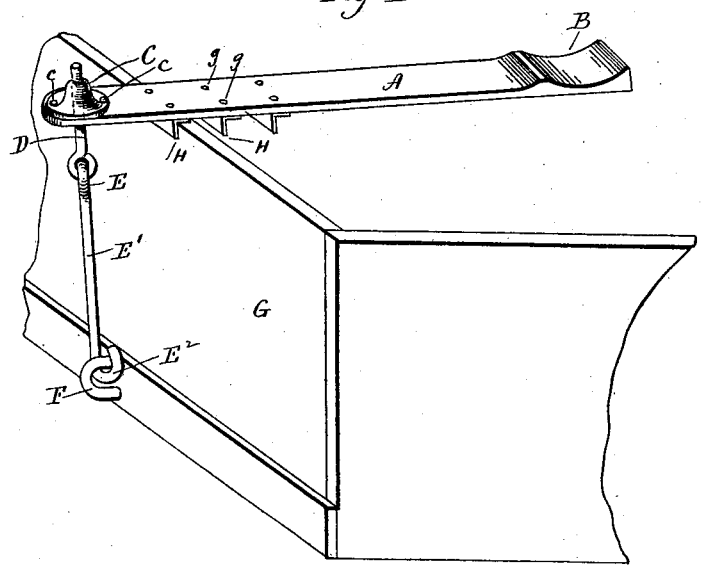
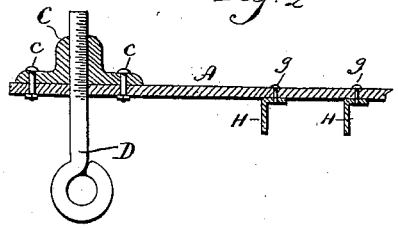

UNITED STATES PATENT OFFICE.

WILLIAM N. HOUGHTALING, OF ANSONIA, CONNECTICUT.

SPRING-BOARD SEAT FOR DUMPING-CARTS.

SPECIFICATION forming part of Letters Patent No. 633,381, dated September 19, 1899.

Application filed August 14, 1899. Serial No. 727,173. (No model.)

*To all whom it may concern:*

Be it known that I, WILLIAM N. HOUGHTALING, of Ansonia, in the county of New Haven and State of Connecticut, have invented a new Improvement in Spring-Board Seats for Dumping-Carts, &c.; and I do hereby declare the following, when taken in connection with the accompanying drawings and the letters of reference marked thereon, to be a full, clear, and exact description of the same, and which said drawings constitute part of this specification, and represent, in—

Figure 1, a broken perspective view of a spring-board seat constructed in accordance with my invention; Fig. 2, a broken view thereof in longitudinal section.

My invention relates to an improvement in spring-board seats for dumping-carts and kindred vehicles, the object being to provide a simple, convenient, and comfortable seat adapted to be used when the vehicle is loaded or empty and to be readily put into and out of use.

With these ends in view my invention consists in certain details of construction and combinations of parts, as will be hereinafter described, and pointed out in the claims.

In carrying out my invention as herein shown I employ a spring-board A, provided at its rear end with a seat B, which may be made integral with the board, as shown, or applied to it. At its forward end and upon its upper face the board is provided with a boss-shaped head C, secured in place by bolts $c$ $c$ and formed with a vertical threaded opening for the reception of the threaded stem of a screw-eye D, the eye of which is closed into a corresponding eye E, formed at the upper end of a coupling-rod E', the lower end of which is formed with a hook $E^2$, which is engaged with a staple F, located in convenient position in and preferably to one side of the center of the front G of the cart. Under this construction the coupling-rod is virtually jointed at its upper end to the spring-board and detachably connected at its lower end with the cart. By disconnecting the hook $E^2$ from the staple F the spring-board may be removed from the cart at pleasure and may be as conveniently reapplied thereto. By turning the screw-eye into or out of the head C the rod E' is virtually decreased or increased in length, whereby the pitch of the spring-board may be regulated and changes therein due to use accommodated, for after the board has been in use some time it will sag more or less, and this sag may be taken up through the instrumentality of the screw-eye. Furthermore, the screw-eye provides for adjusting the device to carts which may vary somewhat in the height of their bodies.

In order to prevent the spring-board from "creeping," so to speak, upon the edge of the front of the cart, I provide it upon its lower face with one or more stops H, which are angle-shaped in cross-section, preferably made of metal and secured in place by small bolts or rivets $g$ or in any other manner. As shown, the board is provided with three of these stops; but that number may be increased, if desired. It is apparent that they may be utilized not only for preventing the board from creeping, but for changing the rearward extension of the seat B into the cart.

When in use, my improved seat is so elastic that it takes the jar and "shake" of a cart or other kindred springless vehicle from the driver, who is thus afforded a comfortable and convenient seat, which he will generally use in returning for a load with an empty cart; but, if desired, he may set the seat so that he can use it with a loaded cart if the cart is not too full.

I would have it understood that I do not limit myself to the exact construction herein shown and described, but hold myself at liberty to make such changes as fairly fall within the spirit and scope of my invention.

Having fully described my invention, what I claim as new, and desire to secure by Letters Patent, is—

1. A spring-board seat for dumping-carts and kindred vehicles, comprising a board provided at its rear end with a seat, and a coupling-rod adapted at its upper end to be connected with the forward end of the board, and at its lower end to be connected with the cart.

2. A spring-board seat for dumping-carts and kindred vehicles, comprising a board provided at its rear end with a seat, and a coupling-rod having its upper end flexibly and adjustably connected with the forward end of the board and adapted at its lower end to be connected with the cart.

3. A spring-board seat for dumping-carts and kindred vehicles, comprising a board provided at its rear end with a seat, a screw-eye mounted in the forward end of the said board which projects over the front of the cart, and a coupling-rod jointed at its upper end to the said screw-eye, and having its lower end adapted to be connected to the front of the cart.

4. A spring-board seat for dumping-carts and kindred vehicles, comprising a board provided at its rear end with a seat, a coupling-rod for connecting the forward end of the board with the cart, and one or more stops located upon the lower face of the board for preventing the board from "creeping" upon the upper edge of the cart.

5. A spring-board seat for dumping-carts and kindred vehicles, comprising a board provided at its rear end with a seat, a coupling-rod for connecting the forward end of the board with the cart, and one or more stops of triangular cross-section applied to the lower face of the board for engagement with the edge of the front of the cart for preventing the board from "creeping" thereupon.

6. A spring-board seat for dumping-carts and kindred vehicles, consisting in the combination with a board provided at its rear end with a seat, of a head secured to the upper face of the forward end of the board, and formed with a vertically-arranged threaded opening, a screw-eye mounted in the said head with its eye downward and its stem extending upward into the threaded opening thereof, a coupling-rod formed at its upper end with an eye for receiving the eye of the screw-eye, and at its lower end with a hook for attachment to the front of the cart, and one or more stops applied to the lower face of the board for engagement with the upper edge of the front of the cart for preventing the board from "creeping" thereupon.

In testimony whereof I have signed this specification in the presence of two subscribing witnesses.

WILLIAM N. HOUGHTALING.

Witnesses:
   FREDERIC C. EARLE,
   GEORGE D. SEYMOUR.